(12) United States Patent
Shono

(10) Patent No.: US 6,630,959 B1
(45) Date of Patent: Oct. 7, 2003

(54) SLR DIGITAL STILL CAMERA

(75) Inventor: Tetsuji Shono, Saitama (JP)

(73) Assignee: Pentax Corporation, Tokyo (JP)

(*) Notice: Subject to any disclaimer, the term of this patent is extended or adjusted under 35 U.S.C. 154(b) by 0 days.

(21) Appl. No.: 09/395,180

(22) Filed: Sep. 14, 1999

(30) Foreign Application Priority Data

Sep. 21, 1998 (JP) .......................................... 10-266845

(51) Int. Cl.[7] .................................................. H04N 7/14
(52) U.S. Cl. ...................................... 348/344; 348/374
(58) Field of Search ................................ 348/335, 341, 348/344, 374

(56) References Cited

U.S. PATENT DOCUMENTS 4,757,387 A * 7/1988 Saito .......................... 348/342
4,941,010 A * 7/1990 Aihara et al. ............... 396/111

* cited by examiner

Primary Examiner—Wendy R. Garber
Assistant Examiner—Matthew L Rosendale
(74) Attorney, Agent, or Firm—Greenblum & Bernstein, P.L.C.

(57) ABSTRACT

An SLR digital still camera includes a photographing lens, a quick return mirror made of a half mirror which is movable between a viewing position and a photographing position, a CCD located in the focal plane, an anti-reflection plate which is movable close to or away from a rear surface of the quick return mirror, and an anti-reflection plate driving mechanism which moves the anti-reflection plate to a retracted position in which the anti-reflection plate is retracted from the photographing light path when the quick return mirror is in the viewing position, and moves the anti-reflection plate to a cover position in which the anti-reflection plate extends along the rear surface of the quick return mirror when the latter is in the photographing position, respectively.

4 Claims, 2 Drawing Sheets

SLR DIGITAL STILL CAMERA

BACKGROUND OF THE INVENTION

1. Field of the Invention

The present invention relates to an SLR (single lens reflex) digital still camera, and in particular it relates to an internal reflection prevention mechanism therefor.

2. Description of the Related Art

In an SLR digital still camera proposed by the assignee of the present application, a quick return mirror is made entirely from a half mirror, wherein upon viewing, light transmitted through the half mirror is made incident on a CCD, so that the photometering operation (brightness measuring operation) and the focusing operation (object distance measuring operation) can be carried out based on the output of the CCD; and upon photographing, the half mirror is moved and retracted from the light path, so that all of the light bundles can be directly made incident on the CCD, without loss of light by the half mirror.

In the proposed SLR digital still camera in which the quick return mirror is a half mirror, there is a problem with internal reflection by the half mirror upon photographing. Namely, if the quick return mirror is not a half mirror, it is possible to coat the rear surface thereof with an anti-reflection layer; however, difficulties occur when subjecting the half mirror to an anti-reflection coating treatment. Consequently, in a photographing position in which the half mirror is retracted from the photographing light path, the light reflected by the rear surface of the half mirror reaches the CCD, thus causing flare to occur.

In a known SLR camera which uses a silver-halide type film, the quick return mirror is only provided with a half mirror on the center portion thereof, for the photometering or focusing operation. Furthermore, an auxiliary mirror is provided to reflect the light passing through the half mirror. Upon photographing, the half mirror portion is covered by the auxiliary mirror to thereby prevent the internal reflection.

However, in the above-mentioned SLR digital still camera proposed by the assignee of the present application, no auxiliary mirror is provided and hence the conventional internal reflection prevention mechanism mentioned as above cannot be adopted.

SUMMARY OF THE INVENTION

The primary object of the present invention is to provide an apparatus for preventing internal reflection by the quick return mirror upon photographing in an SLR digital still camera which includes: a photographing lens, a quick return mirror made from a half mirror, and a CCD located at the focal plane; wherein upon viewing, the quick return mirror is located in a photographing light path to make the light carrying an object image transmitted through the photographing lens incident on a finder optical system, and upon photographing, the quick return mirror is retracted from the photographing light path to make the object light incident on a focal plane.

According to an aspect of the present invention, there is provided an SLR digital still camera including: a photographing lens; a quick return mirror made of a half mirror which is movable between a viewing position and a photographing position, the quick return mirror being located (in the viewing position) in a photographing light path to make light carrying an object image transmitted through the photographing lens incident on a finder optical system, and in the photographing position, being retracted from the photographing light path to make the object light incident on a CCD located in a focal plane of the camera; an anti-reflection plate which is movable close to, or away from, a rear surface of the quick return mirror; and an anti-reflection plate driving mechanism which moves the anti-reflection plate to a retracted position in which the anti-reflection plate is retracted from the photographing light path when the quick return mirror is in the viewing position, and to a cover position in which the anti-reflection plate extends along the rear surface of the quick return mirror when the quick return mirror is in the photographing position.

Since the anti-reflection plate is positioned underneath the quick return mirror when at the retracted position, internal reflection of light rays from the quick return mirror cannot occur, thereby preventing flare from occurring in the CCD.

Preferably, the anti-reflection plate driving mechanism includes: a first stationary shaft to which one end of the quick return mirror is mounted; a connecting rod which is mounted at one end thereof to a second stationary shaft, the connecting rod extending substantially in parallel with the quick return mirror; first and second movable shafts which are provided at the other end of the quick return mirror and the other end of the connecting rod, respectively; and a connecting link which connects the first and second movable shafts. The anti-reflection plate is made integral with the connecting link; the first and second stationary shafts and the first and second movable shafts are located at positions which define four corners of a parallelogram; and the anti-reflection plate extends in a direction substantially parallel with the optical axis and is located in the retracted position in which the anti-reflection plate is out of the photographing light path when the quick return mirror is in the viewing position, and is located to extend along the rear surface of the quick return mirror when the quick return mirror is in the photographing position.

According to another aspect of the present invention, the anti-reflection plate driving mechanism includes: a first stationary shaft to which one end of the quick return mirror is mounted; a connecting rod which is mounted at one end thereof to a second stationary shaft and which extends substantially in parallel with the quick return mirror; first and second movable shafts which are provided at the other end of the quick return mirror and the other end of the connecting rod, respectively; and a connecting link which connects the first and second movable shafts. The anti-reflection plate includes a main anti-reflection plate which is made integral with the connecting link and an auxiliary anti-reflection plate which is pivoted at the free end of the main anti-reflection plate with respect to the first movable shaft. The first and second stationary shafts and the first and second movable shafts are located at positions which define four corners of a parallelogram. The main anti-reflection plate extends in a direction substantially parallel with the optical axis and is located in the retracted position in which the main anti-reflection plate is out of the photographing light path when the quick return mirror is in the viewing position, and the main anti-reflection plate is located to extend along the rear surface of the quick return mirror when the quick return mirror is in the photographing position. The auxiliary anti-reflection plate is located in a retracted position in which the auxiliary anti-reflection plate is out of the photographing light path and extends in a direction substantially perpendicular to the main anti-reflection plate when the quick return mirror is in the viewing position, and the auxiliary anti-reflection plate is located to extend in the same direction as the main anti-reflection plate in a substantially same plane along the rear surface of the quick return mirror when the quick return mirror is in the photographing position.

This alternative arrangement allows the CCD to be positioned closer to the anti-reflection plate, and thereby facilitating miniaturization.

Preferably, the auxiliary anti-reflection plate is continuously biased to be substantially flush with the main anti-reflection plate, the connecting link being provided with a pressing member which forces the auxiliary anti-reflection plate, against the biasing force, into the retracted position whereby the auxiliary anti-reflection plate is approximately perpendicular to the main anti-reflection plate when the quick return mirror is in the viewing position.

The present disclosure relates to subject matter contained in Japanese Patent Application No. 10-266845 (filed on Sep. 21, 1998) which is expressly incorporated herein by reference in its entirety.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
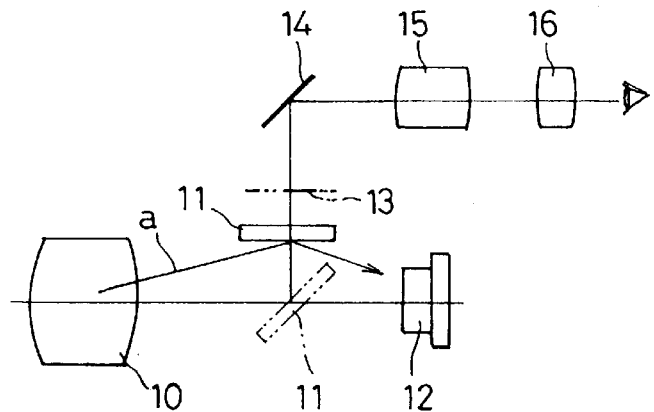
FIG. 1 is a schematic view of an SLR digital still camera in which a quick return mirror is made of a half mirror to illustrate internal reflection.

FIG. 1 shows a conceptual view of an SLR digital still camera. Light passing through a photographing lens 10 is made incident on a quick return mirror 11 made of a half mirror (which will be herein referred to as a QR half mirror 11) which is normally located at a viewing position (indicated by a two-dot chain line) within the photographing light path. The light transmitted through the QR half mirror 11 is received by a CCD 12 which is located in a focal plane of the camera, so that the object distance data (contrast data or defocus data) and/or the object brightness data can be obtained in accordance with the output of the CCD 12. The light reflected by the QR half mirror 11 is made incident on a finder optical system and is converged onto a focusing plate 13 located at a position conjugate with the focal plane to form an object image thereon. The object image formed on the focusing plate 13 is re-formed through a reflection mirror 14 and a relay lens 15, so that the re-formed image can be viewed through an eyepiece 16 as an erect image.

Upon photographing, the QR half mirror 11 is moved to a retracted position indicated by a solid line, in which the QR half mirror 11 is located out of the photographing light path, so that all the light passing through the photographing lens 10 reaches the CCD 12. Namely, the object light can be received by the CCD 12 without a loss of light due to the QR half mirror 11, and thus, a still image can be obtained therefrom.

As mentioned above, the problem with this type of SLR digital still camera is that it is difficult or impossible to provide an anti-reflection coating on the rear surface (back surface) of the QR half mirror 11. Consequently, the light incident on the photographing lens 10 is reflected by the rear surface of the QR half mirror 11 as indicated by an arrow "a", and is received by the CCD 12. The light reflected by the rear surface of the QR half mirror 11 and received by the CCD 12 is extraneous light and causes flare.

The present invention is aimed at the prevention of internal reflection of the light by the rear surface of the QR half mirror 11 in an SLR digital still camera in which the quick-return mirror 11 is made of a half mirror.

Figure 2:
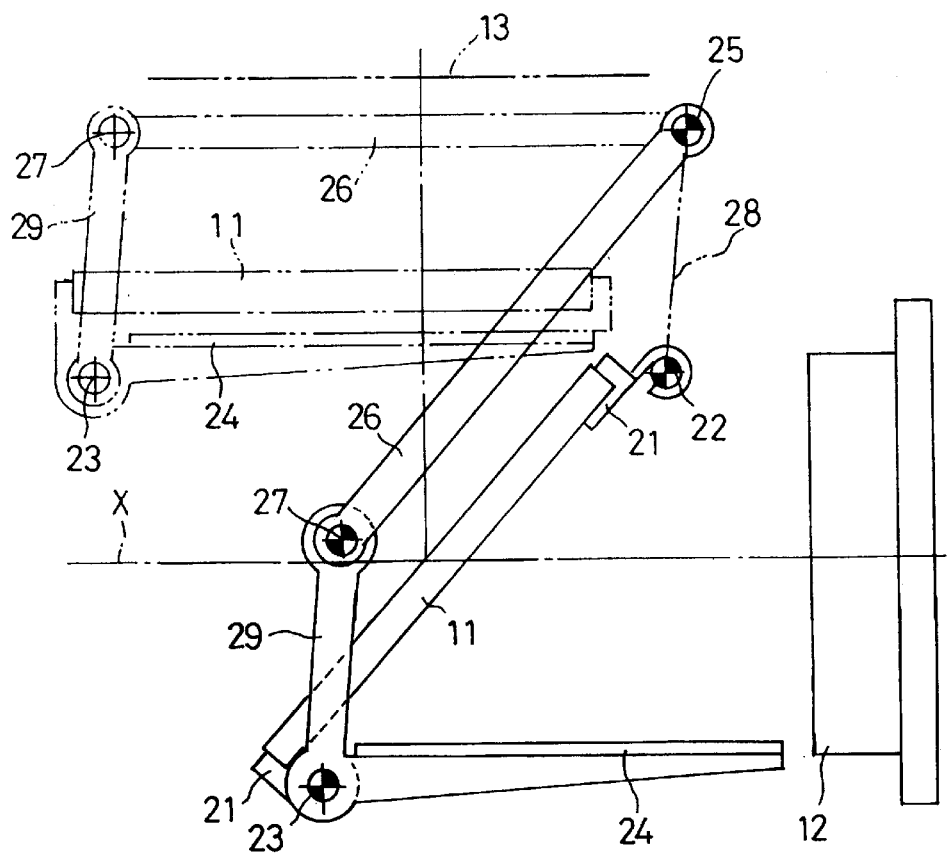
FIG. 2 is a side view of an SLR digital still camera according to an embodiment of the present invention.

FIG. 2 shows a first embodiment of the present invention. In FIG. 2, a mirror seat 21 to which the QR half mirror 11 is secured is rotatably mounted to a first stationary shaft 22 which is in turn secured to a camera body of the SLR digital still camera. The mirror seat 21 is provided on the other end thereof with a pair of first movable shafts 23 on opposite sides thereof (in the direction perpendicular to the page of FIG. 2). An anti-reflection plate 24 is pivoted to and between the movable shafts 23. The anti-reflection plate 24 is formed so that when it is rotated about the first movable shafts 23 toward the mirror seat 21 (QR half mirror 11), the rear surface of the QR half mirror 11 is entirely covered by the anti-reflection plate 24. The anti-reflection plate 24 is provided on its rear surface with an anti-reflection coating. The anti-reflection plate 24 is provided on the opposed sides thereof with connection links 29 integral therewith which extend from the first movable shafts 23 on opposite sides of the mirror seat 21 (QR half mirror 11).

A pair of right and left connecting rods 26 are rotatably mounted at one end thereof to a second stationary shaft 25 which is secured to the camera body, so that the connecting rods 26 are provided above the mirror seat 21 (QR half mirror 11) and extend substantially in parallel with the QR half mirror 11. The connecting rods 26 are provided on the other ends thereof with a pair of second movable shafts 27 to which the upper ends of the connecting links 29 are pivoted. The first stationary shaft 22, the first movable shafts 23, the second movable shafts 27 and the second stationary shaft 25 define four corners of a parallelogram. Imaginary stationary links 28 shown by a phantom line connecting the first stationary shaft 22 and the second stationary shaft 25, the mirror seat 21 (QR half mirror 11), the connecting links 29, and the connecting rods 26 constitute a parallel motion linkage. Namely, when the mirror seat 21 (QR half mirror 11) is rotated about the first stationary shaft 22, the connecting rods 26 and the mirror seat 21 (QR half mirror 11) are moved substantially in parallel and the connecting links 29 are moved substantially in parallel with the imaginary stationary links 28. The first and second stationary shafts 22 and 25, the first and second movable shafts 23 and 27, the connecting rod 26, and the connecting link 29 constitute an anti-reflection plate driving mechanism.

The anti-reflection plate 24 integral with the connecting links 29 always lies in a plane substantially parallel with the optical axis, and the connecting links 29 define a part of the parallel motion linkage. Consequently, the anti-reflection plate 24 extends in the same direction, regardless of the position of the connecting links 29. Thus, when the mirror seat 21 (QR half mirror 11) is moved to the retracted position in which it extends substantially in parallel with the optical axis, the anti-reflection plate 24 extends along the rear surface of the QR half mirror 11. Although the connecting links 29 are substantially perpendicular to the anti-reflection plate 24 in the illustrated embodiment, the angle therebetween can be of a desired angle. The connecting links 29, the connecting rods 26 and the second movable shafts 27 are always located outside of the photographing light path, regardless of the position of the parallel motion linkage.

In the viewing position, indicated by solid lines, in which the mirror seat 21 (QR half mirror 11) is located in the photographing light path at an inclination angle of approximately 45 degrees with respect to the optical axis X of the photographing lens 10, the anti-reflection plate 24 substantially parallel with the optical axis X is located out of the photographing light path. Therefore, the light carrying an object image, transmitted through the QR half mirror 11, reaches the CCD 12 and the object light reflected by the QR half mirror 11 is converged onto the focusing plate 13 of the finder optical system to form an object image.

Upon photographing, when the mirror seat 21 (QR half mirror 11) is rotated upward about the first stationary shaft 22, and is retracted from the photographing light path so that the QR half mirror 11 is substantially in parallel with the optical axis X, the connecting rods 26 are rotated about the second stationary shaft 25 while maintaining a parallel relationship to the mirror seat 21 (QR half mirror 11), and the connecting links 29 are moved upward while maintaining the parallel relationship to the imaginary stationary links 28. Consequently, the anti-reflection plate 24 which is always parallel with the optical axis extends along the rear surface of the mirror seat 21 (QR half mirror 11). Therefore, no object light passing through the photographing lens 10 is reflected by the rear surface of the QR half mirror 11 or reaches the CCD 12. If the QR half mirror 11 (mirror seat 21) is returned to the viewing position, the anti-reflection plate 24, the connecting links 29 and the connecting rods 26 are also returned to the viewing position indicated by the solid lines. Note that the mechanism for driving the QR half mirror 11 (mirror seat 21) is the same as that of a conventional SLR camera, and hence, no detailed explanation therefor is given herein.

Figure 3:
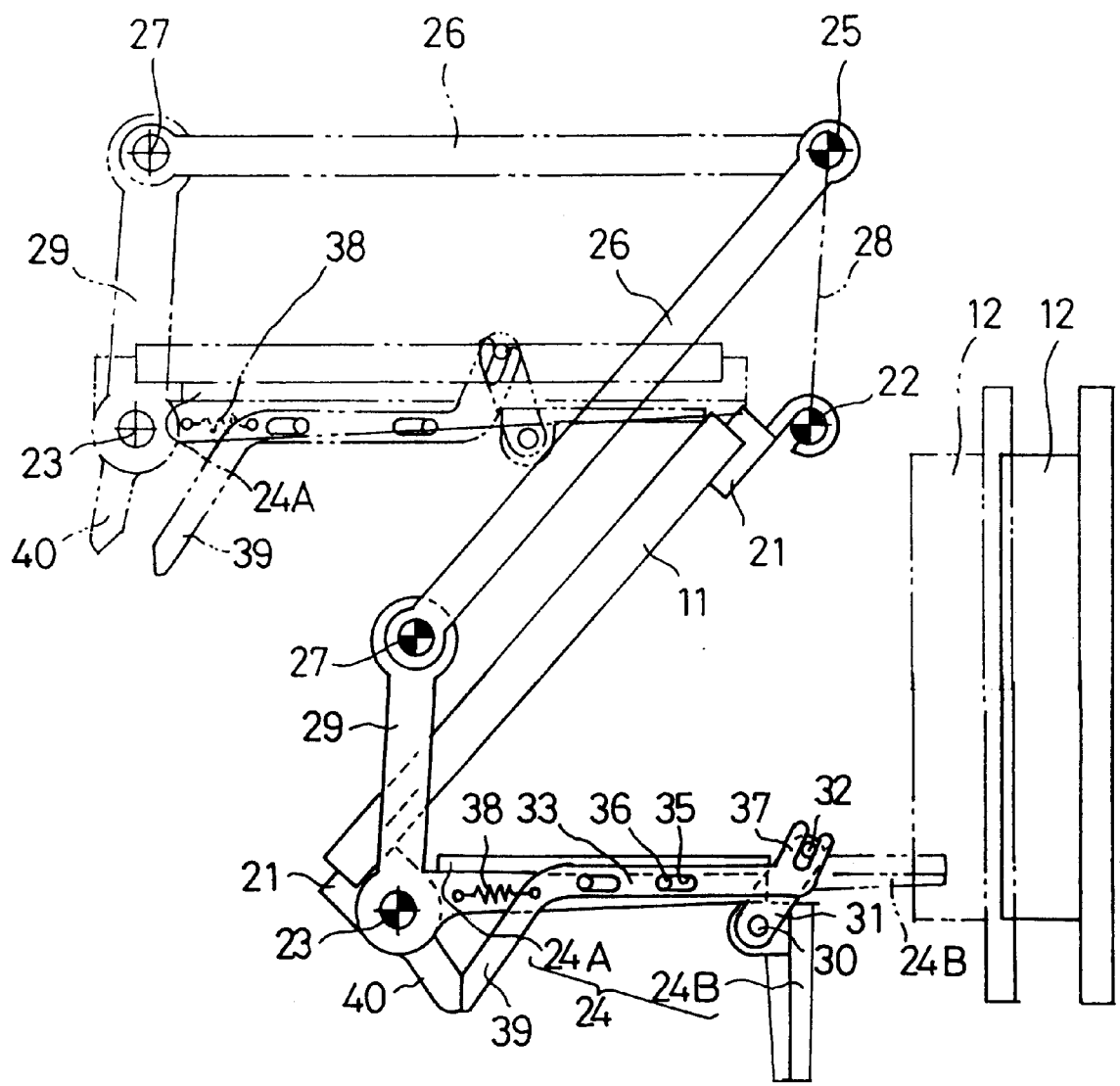
FIG. 3 is a side view of a main part of another embodiment of an SLR digital still camera.

FIG. 3 shows a second embodiment of the present invention. In the second embodiment, the anti-reflection plate 24 in the first embodiment is split into a main plate 24A and an auxiliary plate 24B and the CCD 12 can be located close to the anti-reflection plate 24 to enable miniaturization of the camera. The main anti-reflection plate 24A is analogous to, and smaller than, the anti-reflection plate 24 in the first embodiment. The main anti-reflection plate 24A is provided on the free end thereof (i.e., the opposite end thereof with respect to the first movable shaft) with shafts 30 on both ends thereof with respect to a direction perpendicular to the page of FIG. 3, so that the auxiliary anti-reflection plate 24B is pivoted to and between the shafts 30. The auxiliary anti-reflection plate 24B is movable between a first position indicated by phantom lines, in which it lies in the substantially same plane as the main anti-reflection plate 24A and a second position (retracted position) indicated by solid lines, in which the auxiliary anti-reflection plate 24B extends in a direction substantially perpendicular to the main anti-reflection plate 24A and is located out of the photographing light path. The auxiliary anti-reflection plate 24B is provided with drive arms 31 integral therewith, which extend in a direction opposite to the direction the auxiliary anti-reflection plate 24A extends with respect to the shafts 30. The drive arms 31 are provided with drive pins 32 projecting therefrom.

The main anti-reflection plate 24A is provided with drive plates 33 on the both edges thereof with respect to a direction perpendicular to the page of FIG. 3. The drive plates 33 are movable by a predetermined distance. Namely, the drive plates 33 are provided with elongated holes 35 in which pins 36 provided on the main anti-reflection plate 24A are fitted. The drive plates 33 are each provided, on the end thereof adjacent to the auxiliary anti-reflection plate 24B, with a bifurcated portion 37 which holds therein the drive pin 32 of the auxiliary anti-reflection plate 24B. The drive plates 33 are biased by tension springs 38 in a direction to bias the auxiliary anti-reflection plate 24B into the first position in which the auxiliary anti-reflection plate 24B extends in the substantially same direction as the main anti-reflection plate 24A, via the bifurcated portions 37 and the drive pins 32. The extremity of the movement of the drive plates 33 by the tension springs 38 is restricted by the engagement of the elongated holes 35 and the pins 36. At this extremity, the auxiliary anti-reflection plate 24B lies in the substantially same plane as the main anti-reflection plate 24A.

The drive plates 33 are provided, on the ends opposite to the bifurcated portions 37 and in the close vicinity of the first movable shafts 23, with abutment members 39 which abut against abutment stubs (pressing members) 40 provided on the mirror seat 21 against the tension springs 38. The abutment stubs 40 press the drive plates 33 so as to oppose the tension springs 38 when the mirror seat 21 (QR half mirror 11) is in the viewing position, so that the auxiliary anti-reflection plate 24B is moved (rotated) to extend in the direction perpendicular to the main anti-reflection plate 24A, as indicated by the solid line in FIG. 3. If the mirror seat 21 (QR half mirror 11) is moved to the retracted position, the abutment stubs 40 are released from the corresponding abutment members 39 and consequently, the drive plates 33 are forced to the opposite extremity of movement via the tension springs 38, as shown by a phantom line in FIG. 3. Namely, the main anti-reflection plate 24A is flush with the auxiliary anti-reflection plate 24B.

In the second embodiment, the movement of the main anti-reflection plate 24A when the movement of the mirror seat 21 (QR half mirror 11) between the viewing position and the photographing position occurs is the same as that of the anti-reflection plate 24 in the first embodiment. In addition to the movement of the main anti-reflection plate 24A, the movement of the auxiliary anti-reflection plate 24B takes place as follows. Namely, in the viewing position indicated by the solid line, in which the mirror seat 21 (QR half mirror 11) is located in the photographing light path at an inclination angle of approximately 45 degrees with respect to the optical axis X of the photographing lens 10, the abutment stubs 40 integral with the mirror seat 21 press the drive plates 33 against the tension springs 38 through the abutment members 39. Consequently, the auxiliary anti-reflection plate 24B is rotated about the shafts 30 in the clockwise direction in FIG. 3 via the bifurcated portions 37 and the drive pins 32, so that the auxiliary anti-reflection plate 24B is approximately perpendicular to the main anti-reflection plate 24A. Namely, the length of the anti-reflection plate 24 which includes the main anti-reflection plate 24A and the auxiliary anti-reflection plate 24B in the axial direction is shortened, and hence it is possible to place the CCD 12 closer to the QR half mirror 11 as shown by a phantom line in FIG. 3, thus resulting in further miniaturization of the camera.

Upon photographing, when the mirror seat 21 (QR half mirror 11) is rotated upward about the first stationary shaft 22, the abutment stubs 40 are released from the corresponding abutment members 39, so that the drive plates 33 are moved due to the spring force of the tension springs 38 until the pins 36 come to the opposite end of the elongated holes 35 (i.e., to the right extremities of the elongated holes 35 as shown in FIG. 3). Consequently, the auxiliary anti-reflection plate 24B is rotated about the shafts 30 through the bifurcated portions 37 and the drive pins 32 in the counterclockwise direction in FIG. 3, so that the auxiliary anti-reflection plate 24B forms an extension of the main anti-reflection plate 24A in the same plane and covers the rear surface of the QR half mirror 11 in conjunction with the main anti-reflection plate 24A. In the second embodiment, it is possible to prevent the internal reflection by the QR half mirror 11 as in the first embodiment, while making it possible to place the CCD 12 in close proximity to the QR half mirror 11.

Note that the present invention can be equally applied to an SLR digital still camera in which a pentagonal prism is employed in place of the reflection mirror 14 and the relay lens 15.

As can be understood from the above discussion, in an SLR digital still camera in which the quick return mirror is made of a half mirror, no internal reflection by the quick return mirror upon photographing occurs.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An SLR digital still camera comprising:

a photographing lens;

a quick return mirror comprising a half mirror which is movable between a viewing position and a photographing position, said quick return mirror being located, in said viewing position, in a photographing light path to make light carrying an object image transmitted through the photographing lens incident on a finder optical system, and in said photographing position, being retracted from the photographing light path to make the object light incident on a CCD located in a focal plane of the camera;

an anti-reflection plate which is movable close to, or away from, a rear surface of the quick return mirror; and an anti-reflection plate driving mechanism which moves the anti-reflection plate to a retracted position in which the anti-reflection plate is retracted from the photographing light path when the quick return mirror is in said viewing position, and to a cover position in which the anti-reflection plate extends along the rear surface of the quick return mirror when the quick return mirror is in said photographing position.

2. An SLR digital still camera according to claim 1, wherein said anti-reflection plate driving mechanism comprises:

a first stationary shaft to which one end of said quick return mirror is mounted;

a connecting rod which is mounted at one end thereof to a second stationary shaft, said connecting rod extending substantially in parallel with the quick return mirror;

first and second movable shafts which are provided at the other end of the quick return mirror and the other end of the connecting rod, respectively; and a connecting link which connects said first and second movable shafts;

wherein:

said anti-reflection plate is made integral with the connecting link;

said first and second stationary shafts and said first and second movable shafts are located at positions which define four corners of a parallelogram; and said anti-reflection plate extends in a direction substantially parallel with the optical axis and is located in the retracted position in which the anti-reflection plate is out of the photographing light path when the quick return mirror is in the viewing position, and is located to extend along the rear surface of the quick return mirror when the quick return mirror is in the photographing position.

3. An SLR digital still camera according to claim 1, wherein said anti-reflection plate driving mechanism comprises:

a first stationary shaft to which one end of said quick return mirror is mounted;

a connecting rod which is mounted at one end thereof to a second stationary shaft and which extends substantially in parallel with the quick return mirror;

first and second movable shafts which are provided at the other end of the quick return mirror and the other end of the connecting rod, respectively; and a connecting link which connects said first and second movable shafts;

said anti-reflection plate comprising a main anti-reflection plate which is made integral with the connecting link and an auxiliary anti-reflection plate which is pivoted at the free end of the main anti-reflection plate;

wherein:

said first and second stationary shafts and said first and second movable shafts are located at positions which define four corners of a parallelogram;

said main anti-reflection plate extends in a direction substantially parallel with the optical axis and is located in the retracted position in which the main anti-reflection plate is out of the photographing light path when the quick return mirror is in the viewing position, and said main anti-reflection plate is located to extend along the rear surface of the quick return mirror when the quick return mirror is in the photographing position; and said auxiliary anti-reflection plate is located in a retracted position in which the auxiliary anti-reflection plate is out of the photographing light path and extends in a direction substantially perpendicular to the main anti-reflection plate when the quick return mirror is in the viewing position, and said auxiliary anti-reflection plate is located to extend in the same direction as the main anti-reflection plate in a substantially same plane along the rear surface of the quick return mirror when the quick return mirror is in the photographing position.

4. An SLR digital still camera according to claim 3, wherein said auxiliary anti-reflection plate is continuously biased to be substantially flush with the main anti-reflection plate, said connecting link being provided with a pressing member which forces the auxiliary anti-reflection plate, against the biasing force, into the retracted position whereby the auxiliary anti-reflection plate is approximately perpendicular to the main anti-reflection plate when the quick return mirror is in the viewing position.

* * * * *